United States Patent
Wang

(10) Patent No.: US 11,427,155 B2
(45) Date of Patent: *Aug. 30, 2022

(54) SMART ALARM MODULE FOR AUTOMOBILE SECURITY SYSTEM

(71) Applicant: Reng-Shan Wang, Taipei (TW)

(72) Inventor: Reng-Shan Wang, Taipei (TW)

(*) Notice: Subject to any disclaimer, the term of this patent is extended or adjusted under 35 U.S.C. 154(b) by 24 days.

This patent is subject to a terminal disclaimer.

(21) Appl. No.: 17/037,834

(22) Filed: Sep. 30, 2020

(65) Prior Publication Data

US 2021/0323502 A1   Oct. 21, 2021

Related U.S. Application Data

(63) Continuation-in-part of application No. 16/931,519, filed on Jul. 17, 2020, which is a continuation of application No. 16/907,484, filed on Jun. 22, 2020, now Pat. No. 11,059,454.

(60) Provisional application No. 63/012,263, filed on Apr. 20, 2020.

(51) Int. Cl.
*B60R 25/20*     (2013.01)

(52) U.S. Cl.
CPC .................. *B60R 25/20* (2013.01)

(58) Field of Classification Search
CPC ..... B60R 25/04; B60R 25/20; B60R 25/1003; B60R 25/1009; B60R 2025/1013; G07C 9/00182; G07C 2009/00214; H04L 12/40013; H04L 2012/40215; H04L 2012/40273

See application file for complete search history.

(56) References Cited

U.S. PATENT DOCUMENTS

| | | | | |
|---|---|---|---|---|
| 5,850,173 A | * | 12/1998 | DiCroce | B60R 25/1001 307/10.6 |
| 6,956,467 B1 | * | 10/2005 | Mercado, Jr. | B60R 25/042 340/426.2 |
| 2005/0253691 A1 | * | 11/2005 | Parnaby | B60R 25/20 340/426.11 |
| 2006/0017550 A1 | * | 1/2006 | Yoshida | B60R 25/1018 340/426.11 |
| 2010/0048244 A1 | * | 2/2010 | Goren | B60R 25/20 455/556.1 |

* cited by examiner

*Primary Examiner* — Sisay Yacob
(74) *Attorney, Agent, or Firm* — Chih Feng Yeh; Huntington IP Consulting Co., Ltd.

(57) ABSTRACT

A smart alarm module includes a first connector terminal providing conductive paths from the fused box and the audio device to the smart alarm module, a second connector terminal providing conductive paths from the on-board electronics to the smart alarm module, an input interface connecting the on-board electronics to detect communication protocol and receive information from the remote controller, a microcontroller arming the smart alarm module responsively to the content of the information to provide judgment operation, a sensor quantizing shock waves on the vehicle then feeding a first activating signal to the microprocessor when the quantized values exceeds a predetermined value, a power supply regulator regulating and providing power to the input interface, the microprocessor, and the sensor, and an output interface sounding the audio device, drive the vehicle's door switch in response to output signal from the microprocessor, and detect vehicle's speed from the on-board electronics.

16 Claims, 10 Drawing Sheets

SMART ALARM MODULE FOR AUTOMOBILE SECURITY SYSTEM

CROSS-REFERENCE TO RELATED APPLICATIONS

The present application is based on and claims priority from U.S. Provisional Application Ser. No. 63/012,263 filed on Apr. 20, 2020, U.S. patent application Ser. No. 16/907,484, filed on Jun. 22, 2020, and U.S. patent application Ser. No. 16/931,519 filed on Jul. 17, 2020 respectively, the disclosure of which are hereby incorporated in reference in their entirety.

TECHNICAL FIELD

The present invention relates to security system installed in automobiles, and more particularly, a smart alarm module for automobile security system.

BACKGROUND

Conventional car security system is typically provided with sensors for monitoring the opened or closed states of a car door, a bonnet and a trunk, and a sensor for detecting vibration of the car. When any of these sensors detects an abnormal condition while the car security function of the system is on (armed), a siren is sound and an engine starter is disabled when an ignition switch is subsequently turned on.

The car security system is typically operated from a remote control unit that transmits wireless communication signals via radio waves, infrared rays, or ultrasonic waves. A user turns off (disarm) the security function of the system while driving the car. When the user gets out of and leaves the car, he/she sends out a signal from the remote unit to the car security system to turn on (arm) the security function.

Traditional security system is usually in the state "always on", in other words, as long as the vehicle battery is connected, and a door was opened, then the shock may trigger a sensor, for example shock sensor, and activate an output (e.g. siren or horn and/or parking light and/or headlight flashing) of the security system.

In the present time, there are many automobile security systems available in the market. A typical automobile security system, its functional diagram as illustrated in FIG. 1, the microcontroller unit 101 receives incoming signal 103 sent from a transmitter 102 (remote unit) through a transceiver 105 and compares or verifies the coded signal with a code stored in a memory 107, which may be EEPROM (not shown) in the microcontroller unit 101. If the code is verified, then a series of output signals are provided to an output terminal of the microcontroller unit 101. These output signals generated from the microcontroller unit 101 are typically a series of control signals or pulses to participate activities such as locking the doors and arming the system. For example, arming the system causes a flash of the automobile parking lights, a single chirp from the siren, and causing the flashing of the interior LED status indicator to activate. Additionally, arming the system causes the starter to be cut and if the interior dome light is on, to turn it off, as would be readily understood by those skilled in the art. A voltage regulator 20 powers the automobile security system.

The memory 107 functions as an internal memory for the microcontroller unit 101 or as an auxiliary memory for other incorporated components. As illustrated, the input interface 109 is connected to various vehicle inputs including valet switch 111, program switch 113, and override switch 115.

In addition, a typical security system includes inputs or sensors (e.g. to sense if a door is open or close), and outputs (e.g. to a siren or lighting devices). The security system is either usually always on, and the automobile battery is connected to the microcontroller unit. The security system is either armed (i.e. ready to sense an input sensor and activate an output in response thereto), or disarmed (i.e. not to be activated by a sensor). When the system is armed, and the sensor is activated, then a sensor designed to sense this situation is triggered, and the security system will send an output-to-alarm signal (e.g. siren) to make the SIREN or HORN honk.

As shown in FIG. 1, the override switch 115 provides an input to the microcontroller unit 101. The switch is typically a depress switch located within the car and placed at a position known only to the driver, which would send a signal pulse to the microcontroller unit 101. This is usual for the location of the override switch, as is the location for a valet switch 111. The trigger and sensor circuitry 117 performs the security of the automobile. When the trigger and sensor circuitry 117 detects touching, it generates a signal and feeds it directed to the microcontroller unit 101.

As illustrated, the output interface 119 of the microcontroller unit 101 can be connected to a variety of output devices. The outputs may include and not limited to auxiliary relays such as window control 121 or remote start 135, as would be readily understood by those skilled in the art. Other outputs include a door lock 131, starter cutoff 135, disarm/arm outputs 125/127, dome light 129, parking lamp 141, siren 123, and valet/dashboard LED indicator 133.

Vehicle security system are widely used to deter vehicle theft, prevent theft of valuables from a vehicle, deter vandalism, and to protect owners and occupants. However, please refer to FIG. 1, there are many connecting wires to be arranged to connect each corresponding electrical devices of the vehicle, which may include siren/horn, parking lights/head lights, ignition system, door unlock, voltage regulator, trigger and sensor circuitry, LED indicator, receiver . . . etc. A vehicle security system includes two portions, one is the security module to receive signals from the sensors and to output signals to each corresponding electrical devices of the vehicle, the other is the connector wiring set to provide electric coupling between the input/output terminals of the security system module and each corresponding electrical devices of the vehicle.

Although a car security system module with the aforementioned functions can provide basic protection and security requirements, but some more protection function still required. In the present invention, we have proposed a new design of smart sensor module, which integrates two additional functions in the original smart sensor module to automatically locked the car door lock when the vehicle is moving and turn on the door lock after the vehicle is turned off.

SUMMARY OF THE INVENTION

To solve issues aforementioned, we have proposed a new design of smart sensor module, which adds two more functions in the original smart sensor module. The first function added is automatically locked the car door lock when the vehicle is moving. The second function added is turning on the door lock after the vehicle is turned off. For achieving these purposes a smart alarm module for automobile security system is proposed, which includes a first connector terminal adapted to provide conductive paths from the fused box and the audio device of the vehicle to the smart alarm module, a second connector terminal adapted to provide conductive paths from the on-board electronics of the vehicle to the smart alarm module, an input interface adapted to make connection to the on-board electronics of the vehicle to detect communication protocol and receive information from the remote controller, a microcontroller adapted to arm the smart alarm module in response to the information received from the remote controller to provide the smart alarm module judgment operation based on the received information, a sensor adapted to quantized shock waves applied to the vehicle and to feed a first activating signal to the microprocessor when the quantized values exceeds a predetermined value, a power supply regulator for regulating and providing power to the input interface, the microprocessor, and the sensor of the smart alarm module, and an output interface adapted to sound the audio device, drive the vehicle's door switch in response to output signal from the microprocessor, and detect vehicle's speed from the on-board electronics.

In one preferred embodiment, the second connector terminal comprises: a door lock signal output path adapted to drive the vehicle's door switch by receiving an pulsed signal from the microprocessor to lock the vehicle's door; a door unlock signal output path adapted to drive the vehicle's door switch by receiving an pulsed signal from the microprocessor to unlock the vehicle's door; a speed signal input path adapted to detect the vehicle's movement; and a door switch signal input path adapted to detect the vehicle's door signal for determining open/close state of the vehicle's door.

In one preferred embodiment, the door lock signal output path is coupled to the output interface.

In one preferred embodiment, the speed signal input path is coupled to the input interface.

In one preferred embodiment, the door unlock signal output path is coupled to the output interface.

In one preferred embodiment, the door switch signal input path is coupled to the input interface.

In one preferred embodiment, the sensor is selected form the group consisting of: a pizeo shock sensor, a magnetic shock sensor, an ultrasonic sensor, a microwave sensor.

In one preferred embodiment, the smart alarm module further comprising an arm mode and a disarm mode respectively settable in response to a press-down on a lock button and the other press-down on an unlock button of the remote controller.

In one preferred embodiment, the audio device is selected form the group consisting of: car horn, siren, buzzer, and combinations thereof.

In one preferred embodiment, the smart alarm module further comprising an arm mode and a disarm mode respectively settable in response to a press-down on a lock button and the other press-down on an unlock button of the remote controller.

In one preferred embodiment, the microprocessor adapted to arm the smart sensor module in response to the press-down on the lock button resulting in number of voltage-switching times on a positive end of an exterior lighting device of the vehicle equals to a lock value stored in the microprocessor, the microprocessor responsively setting the smart sensor module as disarm mode when the press-down on the unlock button resulting in number of voltage-switching times on the positive end of the exterior lighting device equals to an unlock value stored in the microprocessor, wherein a protection process and a system programming process being stored in the microprocessor, the system programming process providing a mechanism to reset the lock value and the unlock value.

In one preferred embodiment, the exterior lighting device is selected from the group consisting of: light bulb, light emitted diodes, and combinations thereof.

In one preferred embodiment, the smart alarm module having the second connector terminal is operable to perform a speed lock/AC off unlock door process for the vehicle.

In one preferred embodiment, the speed lock/AC off unlock door process comprising the step of: a first step, determining if the vehicle's start switch is turned on, if yes, then determining if all of the vehicle's doors are closed, otherwise go to the first step; determining if the vehicle is moving or not, if yes, go to next step; determining if all of the vehicle's doors are locked, if not, go to the following steps: setting a timer to be a first period of time, then determining if the timer exceeds the first period of time, if yes, lock the vehicle's doors, sets door-locked memory, then go to the step one, otherwise go to next step; determining if all of the vehicle's doors are closed, if yes, clearing the door-locked memory, otherwise go to next step; determining if the vehicle's start switch is turned on, if not, unlocks the vehicle's doors.

In one preferred embodiment, the first period of time is three seconds.

In one preferred embodiment, the step of locking the vehicle's door is performed by receiving a 0.5 second pulse signal from the microprocessor.

In one preferred embodiment, the step of unlocking the vehicle's door is performed by receiving a 0.5 second pulse signal from the microprocessor

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention proposed a smart sensor for automobile security system, which is integrates with automobile's original remote central lock system.

Figure 1:
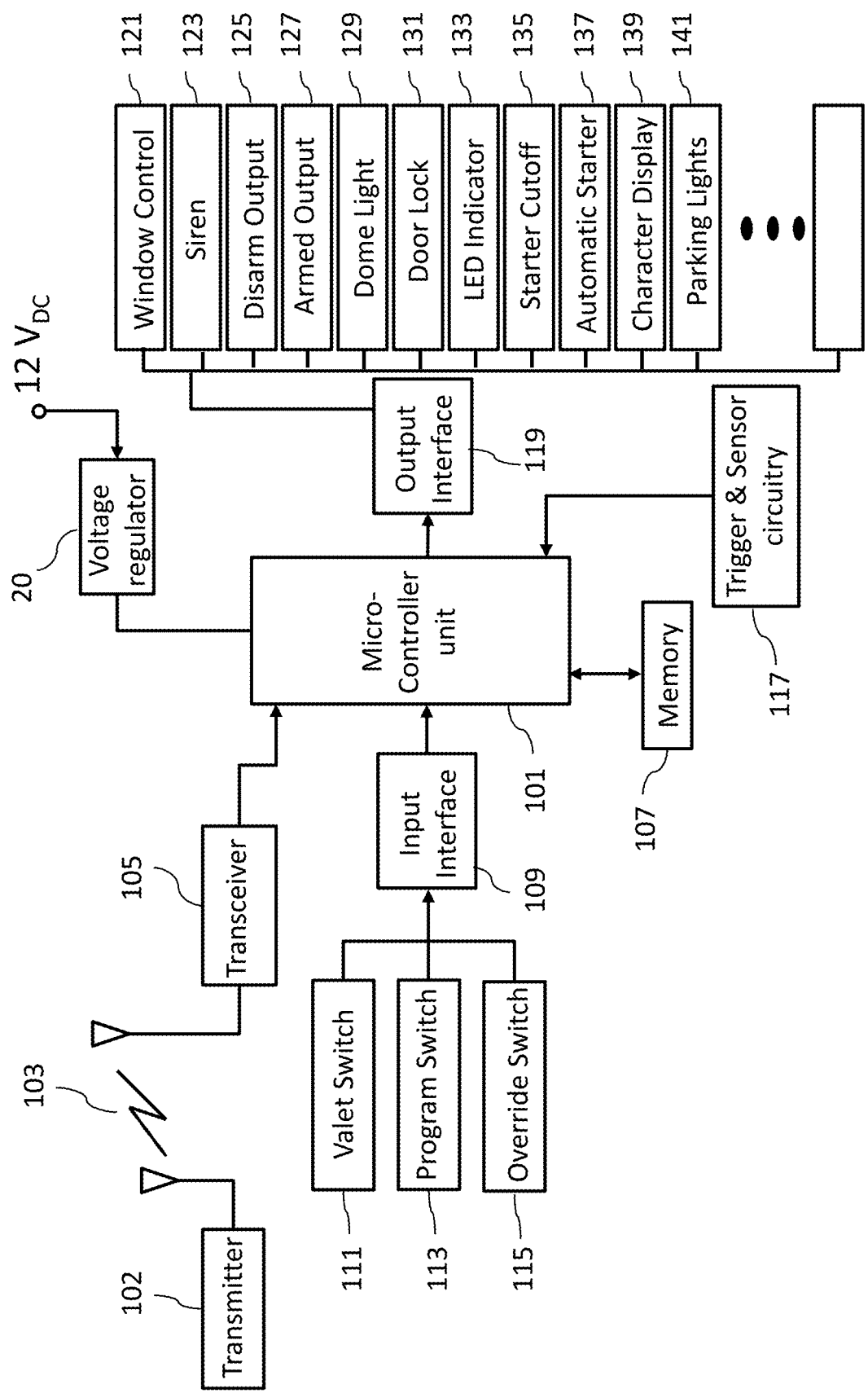
FIG. 1 illustrates a block diagram showing the automobile security system according to a prior art.
Figure 2:
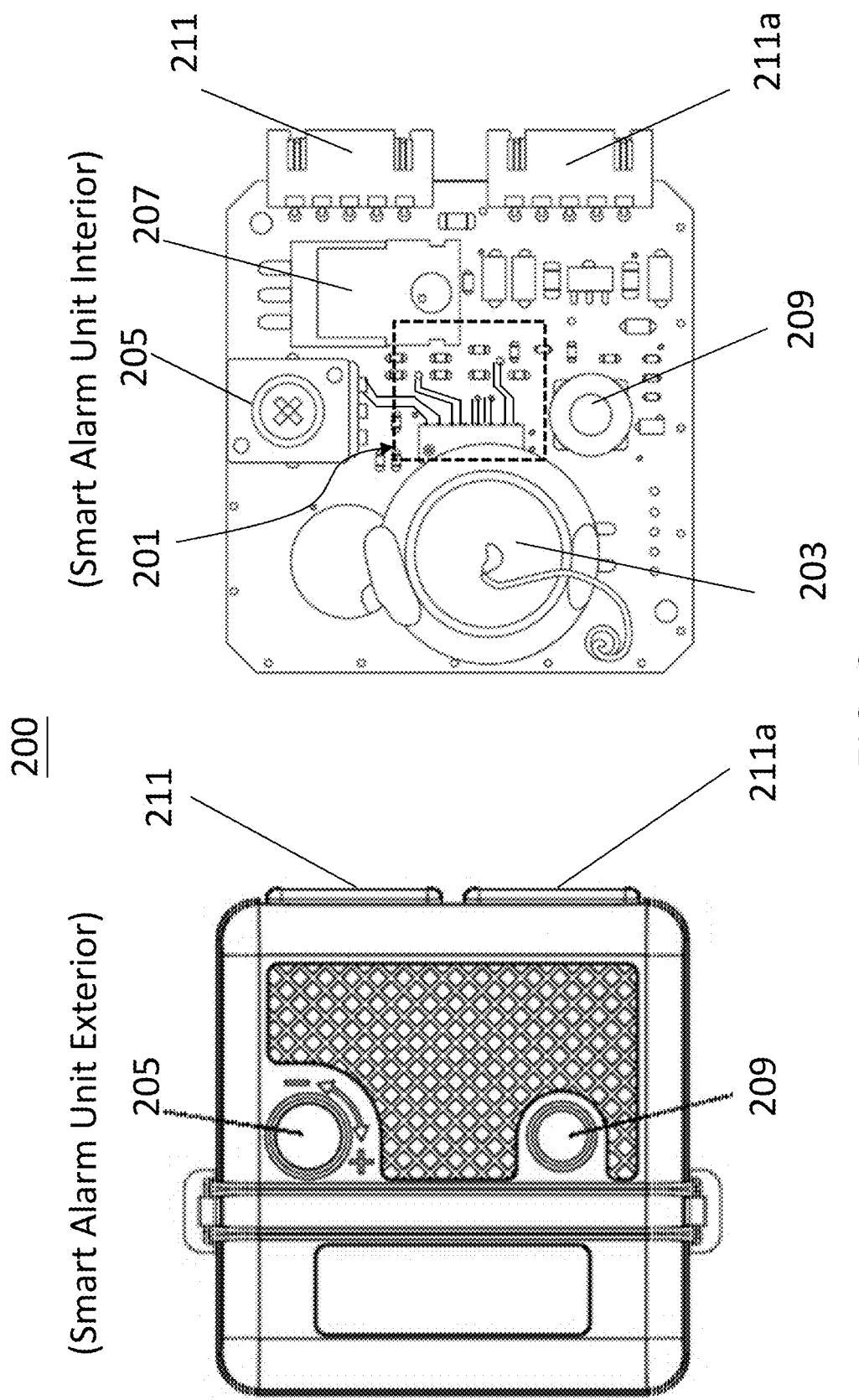
FIG. 2 illustrates exterior and interior of the proposed smart alarm module according to a preferred embodiment of the present invention.

Please refers to FIG. 2, figure on the left (right) shows exterior (interior) of the proposed smart alarm module. The proposed smart sensor 200 includes an input interface 201 connected to a core sensing component 203, a sensitivity adjustment nub 205, an ACC input port, a parking light input port, and two five-wire connectors 211 and 211a, and an output interface containing a Siren/Car Horn output port 207 and a push button/LED 209. The internal circuit also includes input interface 201 can control arm/disarm, alarm functions of the device, and learn the number of times of the parking light flashes of the device. The core sensing component 203 can include a piezo shock sensor, a magnetic shock sensor, an ultrasonic sensor, or a microwave sensor. The output interface includes a siren/horn output port, LED light indication, etc. Where the first five-wire connector 211 includes +12 V port, ground (GND) port, an ACC I/P (+) port, a parking light I/P(+) port, and a Siren/Car Horn output port; the second five-wire connector 211a includes a SPEED I/P port, a DOOR SWITCH I/P(+) port, a DOOR SWITCH I/P(-) port, a DOOR UNLOCK O/P(-) port, and a DOOR LOCK O/P(-) port.

The smart alarm module (smart sensor) is designed to install in a vehicle and integrate with vehicle's remote central door locking system. Nowadays in the auto market, all cars sold will be equipped with a remote control having central lock function provided by their original car manufacture. When the owner uses the original car's remote control to lock the remote controlled doors, the vehicle flashes its paring light one time to indicate that the vehicle's doors have been locked. When the owner uses the remote control to unlock the remote controlled doors, the vehicle flashes its paring light two times to indicate that the vehicle's doors have been unlocked.

The present invention captures some fundamental features of security system accompanied with widely-used common operational visual characteristic of vehicle's locking/unlocking action. In addition, the present invention introduces extended capability of integrating a smart alarm module by adding hardware, i.e. newly designed electric circuit board, with additional five-wire I/O ports, DOOR LOCK O/P(-), DOOR UNLOCK O/P(-), SPEED I/P, DOOR SWITCH I/P(-), and DOOR SWITCH I/P(-) coupled to vehicle's on-board electronics to obtain extra functions, such as automatically locked the car door when the vehicle is moving and turn on the door lock after the vehicle is turned off.

Figure 3A:
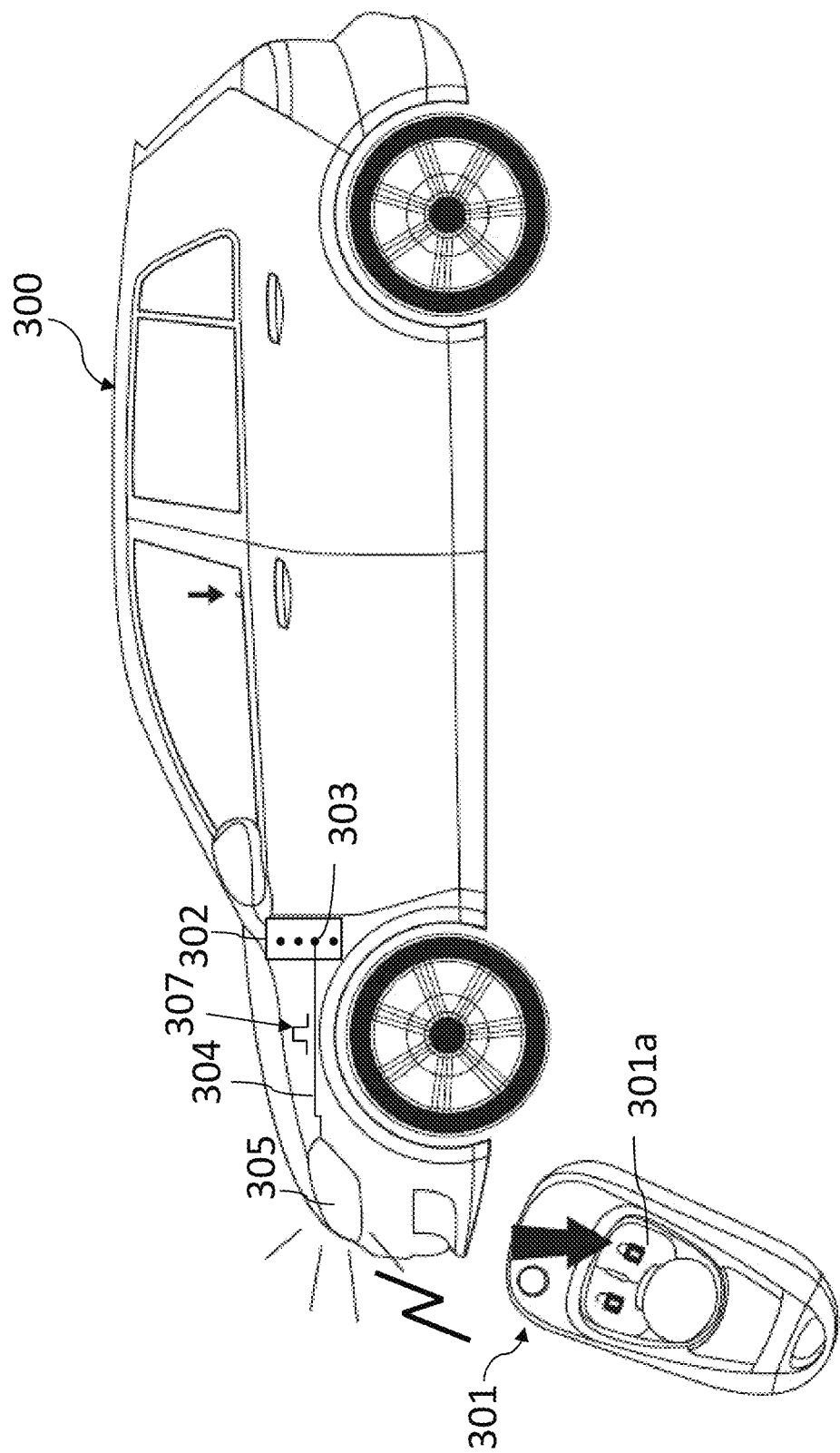
FIG. 3A illustrates the reaction of a vehicle equipped with central locking system but not yet installed any alarm system, when the LOCK button on the remote controller from the original manufacturer was pressed-down.
Figure 3B:
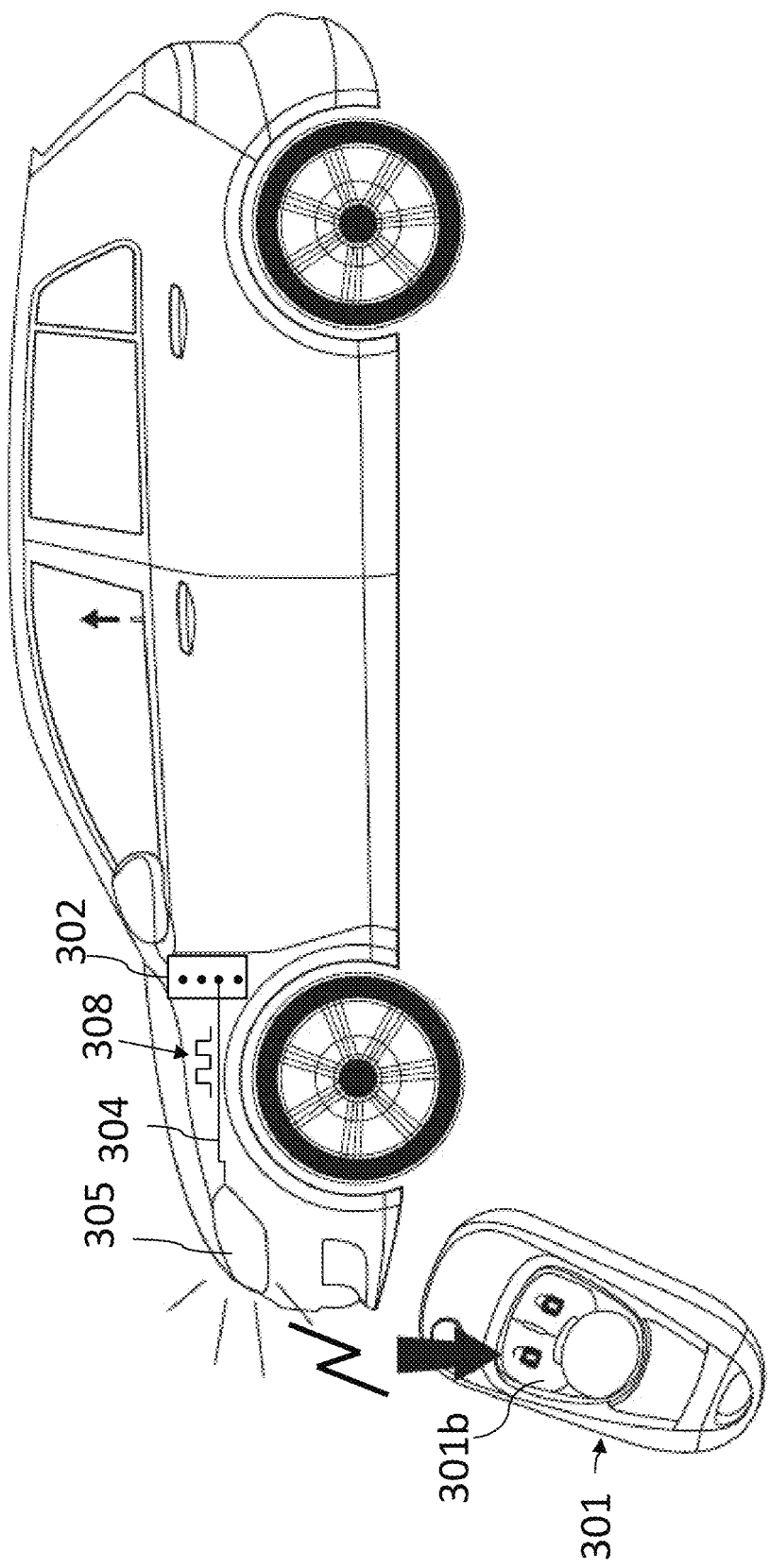
FIG. 3B shows the reaction of a vehicle equipped with central locking system but not yet installed any alarm system, when the UNLOCK button on the remote controller paired to the vehicle from the original manufacturer was pressed.

A vehicle 300 equipped with a central lock system always comes with a remote controller 301 paired to the vehicle 300 by its manufacture, prior to the installation of any vehicle security system. How the vehicle 300 reacts with the operation of the remote controller (LOCK/UNLOCK) 301 are illustrated in FIG. 3A and FIG. 3B, respectively. FIG. 3A illustrates when the driver leaves the vehicle 300, closes the door, and then presses the LOCK button 301a on the vehicle's remote controller 301, the vehicle's central locking system will responsively lock the doors. At the same time, the fuse box 302 receives a voltage switching on one of the fuse 303 electrically coupled to the positive terminal of parking light 305. Because there is a voltage switching, i.e. voltage pulse 307, applied to the parking light 305, it flashes once in response to the driver's action of pressing the LOCK button 301a on the remote controller 301. It is obvious that when the LOCK button 301a is pressed, there will be a voltage switching transmitted through the connecting wire 304 to the parking light 305 and make it flash once, this may be referred as a flash pattern of the parking light 305. In addition, the number of flashes of the paring light is equal to the number of the voltage level switching times on the connecting wires coupled to the parking light 305. In FIG. 3B, the UNLOCK button 301b of the vehicle's remote controller 301 is pressed, the other voltage pulse 308, which is generated by the central locking system, was transmitted to the parking light 305 and make it flash twice. This flash pattern of parking light (flashing twice) 305 is used as an indication that the car's door has been unlocked. At this moment, the voltage on the connecting wire 304 electrically coupled to the parking light 305 varies in response to the driver's action of pressing the UNLOCK button 301b on the remote controller 301.

Figure 4A:
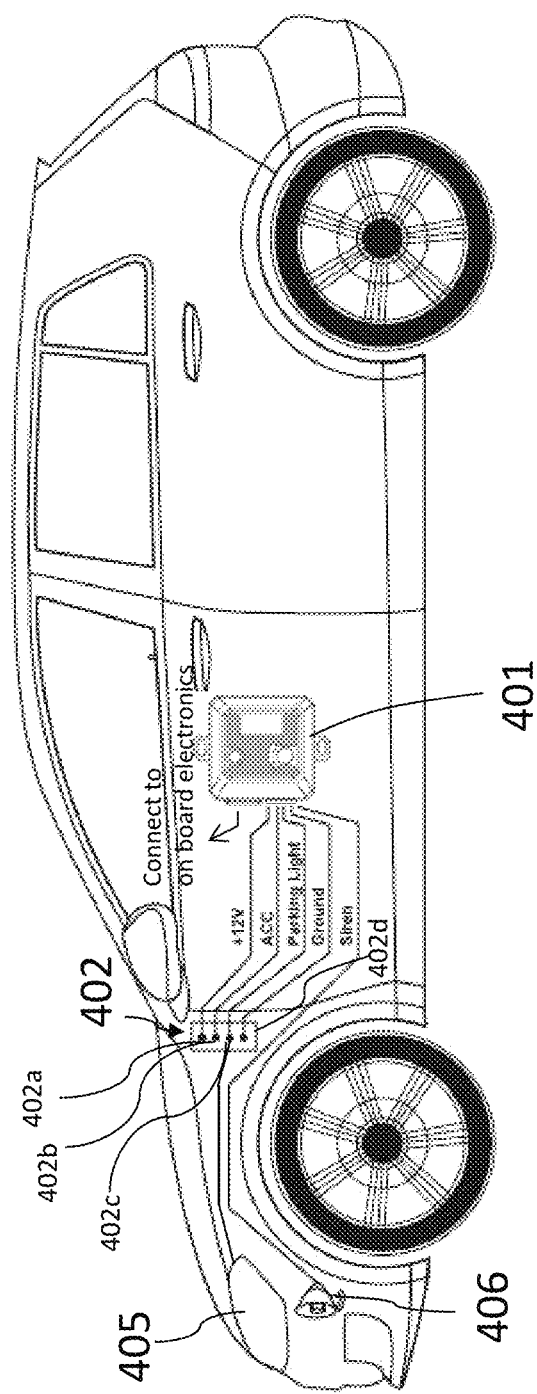
FIG. 4A shows the wiring diagram of the smart alarm system according to one embodiment of the present invention, according to which, the smart sensor module is connected to the siren, the fuse box, headlight, and the on-board electronics of the vehicle.

FIG. 4A depicts how to wire the smart alarm module 401 to a vehicle's central lock system according to one embodiment of the present invention. The installation includes connecting four conducting wires of the first five-wire connector (i.e. 211 in FIG. 2) of the smart alarm module 401 to four fuses (402a, 402b, 402c, and 402d) of the fuse box 402, which can be found in each vehicle, wherein one of the four connecting wires is connected to the fuse 402c, and then connects to the paring light 405, the fifth connecting (Siren) wire is connected to an audio device, such as a siren 406. The second five-wire connector (i.e. 211a in FIG. 2) includes an additional five-wire I/O ports, DOOR LOCK O/P(-), DOOR UNLOCK O/P(-), SPEED I/P, DOOR SWITCH I/P(-), and DOOR SWITCH I/P(-), which can be wiring to vehicle's on-board electronics to drive the car door, detect car door signal and vehicle's movement.

Figure 4B:
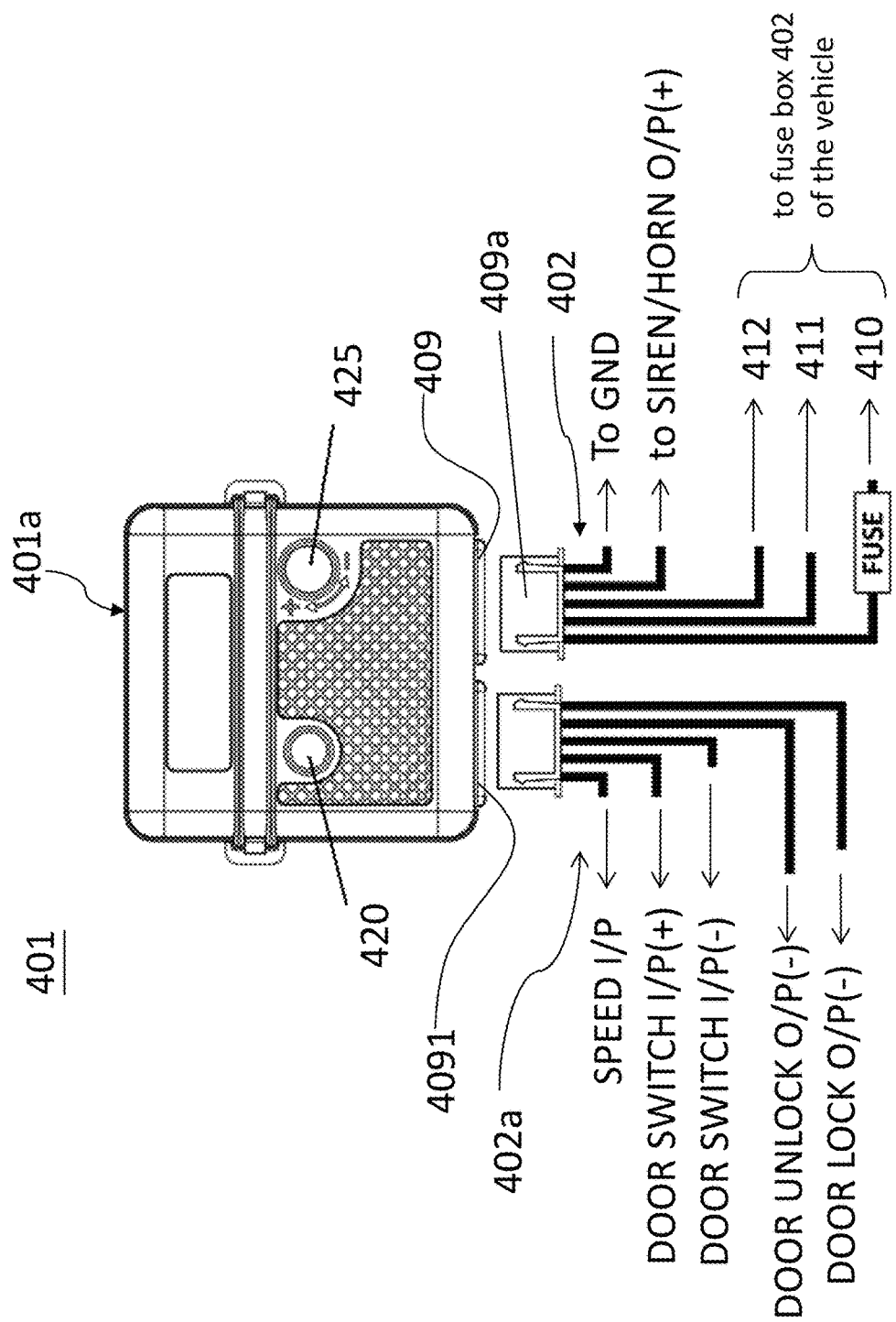
FIG. 4B shows the physical appearance of the smart sensor module and two wiring sets according to one aspect of the embodiment of the present invention.
Figure 4C:
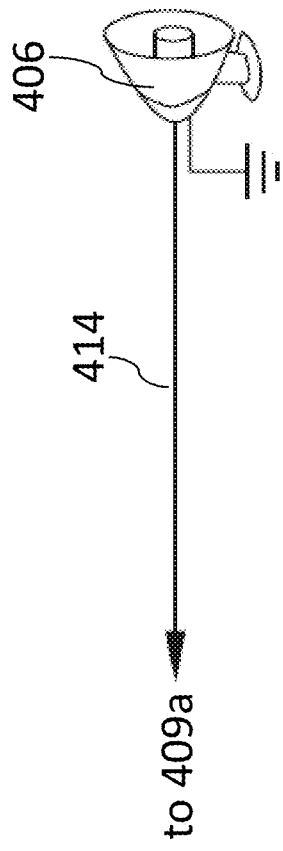
FIG. 4C shows a part of the smart alarm system, in which, a siren is utilized and connected to the other part of the smart alarm system according to one aspect of the embodiment of the present invention.
Figure 4D:
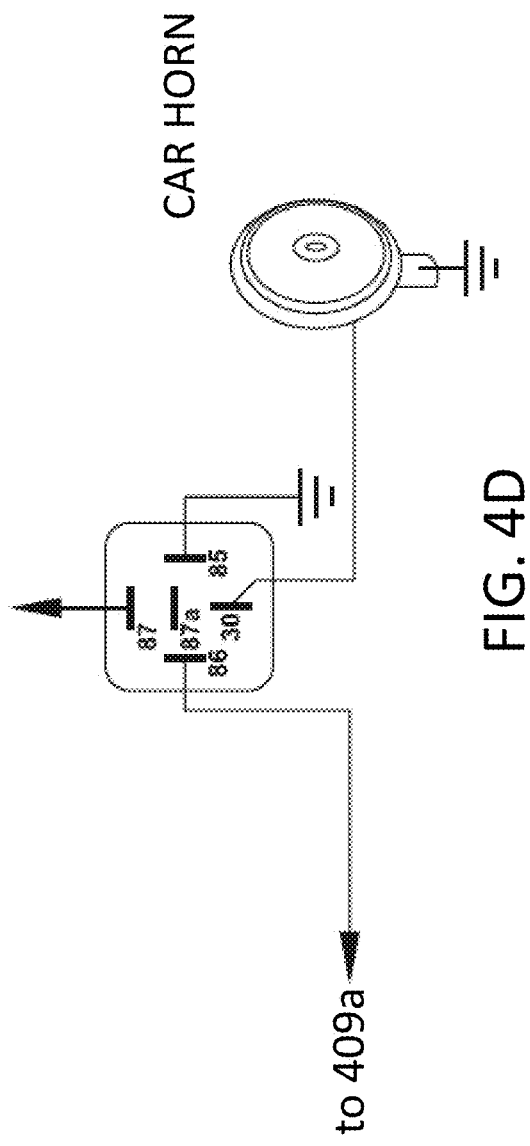
FIG. 4D shows a part of the smart alarm system, in which, a car horn is utilized and connected to the other part of the smart alarm system according to the other aspect of the embodiment of the present invention.

In FIG. 4B, the smart alarm module 401 includes a smart sensor module 401a and two connector wire sets, first connector wire set 402 and second connector wire set 402a. These two connector wire sets 402 and 402a are designed to electrically coupled to the connector terminals 409 and 4091 of the smart sensor module 401a, respectively. The first connector wire set 402 includes a wire 410 connected to a fuse and also connected to fuse box 402 of the vehicle (+12V), a wire 411 electrically coupled to parking light 405, a wire 412 electrically coupled to an accessory input, a wire 413 adopted in the connector wire set 409a is electrically grounded (GND), and a wire 414 electrically coupled to one or both of the following device: a siren or a horn (SIREN/HORN O/P(+)). The second connector wire set 402a includes DOOR LOCK O/P(−) for driving the door switch to lock the car door, DOOR UNLOCK O/P(−) for driving the door switch to unlock the car door, SPEED I/P for detecting vehicle's movement signal, DOOR SWITCH I/P(+)/SWITCH I/P(−) for detecting door signal. In practice, only one of DOOR SWITCH I/P(+)/SWITCH I/P(−) wire is used depended on the wiring of vehicle's battery. FIG. 4C shows one aspect of the preferred embodiment of the present invention. The siren is connected to the wire 414 for receiving output signal from the smart sensor module 401a (see FIG. 4B). FIG. 4D shows the other aspect of the preferred embodiment of the present invention. The CAR horn is connected to the wire 414 for receiving output signal from the smart sensor module 401a (see FIG. 4B).

A switch 420 of the smart sensor module 401a depicted in FIG. 4B is used to start/end the smart sensor module 401a, in one preferred embodiment the switch is a lightable switch, which is a push switch over a light emitted diode (LED), to enable the light from the LED being visible to people. In other embodiment, the switch 420 may utilize other kind of switches that doesn't emit light. An adjustable core sensing component 425, which can be an adjustable piezo shock sensor/magnetic shock sensor/ultrasonic sensor/microwave sensor, is used to adjust a threshold value of the adjustable core sensing component 425 to a suitable level. If anything makes the vehicle shock or vibrate or shake, i.e. any impact applied to the vehicle, to a certain extend exceeds a preset/predetermined value, the smart sensor module 401a will subsequently send a signal through wire 414 to make the audio device such as siren and/or horn honk for a period of time.

Figure 5:
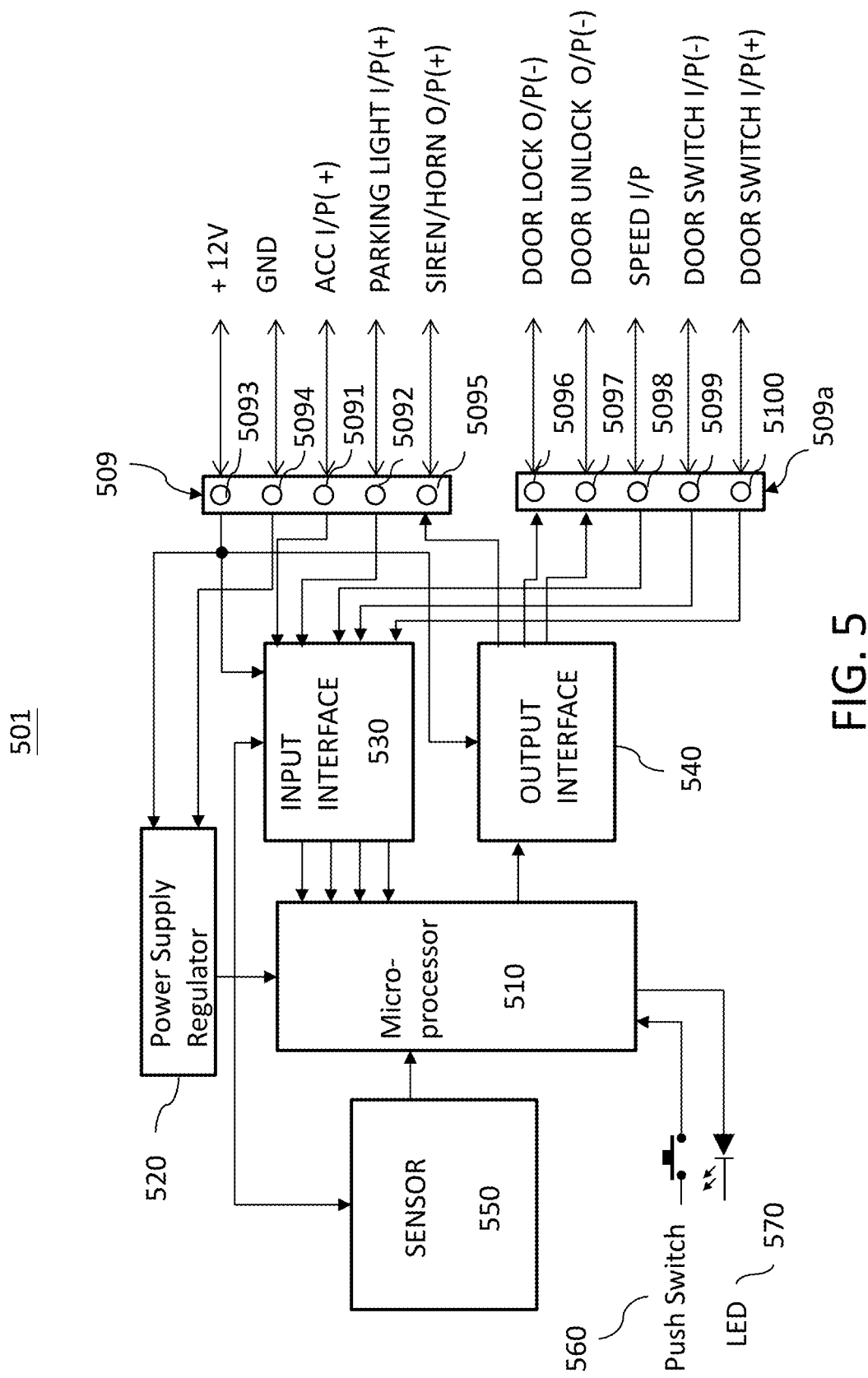
FIG. 5 shows the block diagram of a smart alarm module having an input interface and an output interface coupled to two wiring sets according to a preferred embodiment of the present invention.

Please refer to FIG. 5, it shows the block diagram of a smart alarm module 501 according to one preferred embodiment of the present invention. In the smart sensor module 501, a microprocessor 510 operationally connected to a power supply regulator 520, a sensor 550, a push switch 560, a LED 570, an input interface 530, and an output interface 540; terminal 509 makes electrical connections to the power regulator 520, the input interface 530, the output interface 540 for accepting a connector wire set to be plugged into. Each wire adopted in the connector wire set will be electrically coupled to one corresponding pole adopted in the connector terminal 509. Similarly, terminal 509a makes electrical connections to the input interface 530 and the output interface 540 for accepting a connector wire set to be plugged into. Each wire adopted in the connector wire set will be electrically coupled to one corresponding pole adopted in the connector terminal 509a. In one of the preferred embodiment, the sensor 550 can use a piezo shock sensor, a magnetic shock sensor, an ultrasonic sensor, or a microwave sensor for sensing object movement, impact, vibration, etc. The sensor 550 is adjustable and user can adjust its sensitivity to make it responses properly. The push switch 560 is used to start/end programming the smart alarm module 501, and the on/off status of the LED 570 is used to show the alarm mode of the smart alarm module 501, namely, to show whether the smart alarm module 501 is in arm mode, disarm mode, or triggered entering system programming status. If the LED 570 flashes once for every consecutive second, it represents that the smart alarm module 501 is in ARM MODE. If the LED 570 isn't lightened, it represents that the smart alarm module 501 is in DISARM MODE. If the LED 570 flashes rapidly, it represents that the smart alarm module 501 is being triggered entering system programming, which can be utilized to store the LOCK number and the UNLOCK number into the cue of the microprocessor 510, the rapidly flashing LED 570 indicates the smart alarm module 501 being in this state. Thereafter, the criteria for determining LOCK/UNLOCK is changed to the newly stored LOCK/UNLOCK number, which is referred in this application as LOCK/UNLOCK value.

The power regulator 520 regulates the power from wire coupled to +12 volts to an operation voltage for the microprocessor 510, the input interface 530, the output interface 540, and the sensor 550 to let them work with operation voltage. If a signal from the ACC I/P(+), or from PARKING LIGHT I/P(+) was sent through input interface 530 to microprocessor 510, or if a signal from sensor 550, for example a shock sensor, was sent to the microprocessor 510, subsequently, the microprocessor 510 responsively send a signal to the output interface 540, and then the output interface 540 regulated the signal to the operation voltage to sound the SIREN/HORN to attract the attention from the people nearby the vehicle. The input interface 530 can detect communication protocol from ECUs of the vehicle, for example from the remote controller to obtain the original car remote control LOCK, UNLOCK, DOOR OPEN, ACC ON, and other information to provide the smart alarm module judgment operation under ARM, DISARM, TRIGGER and other modes.

As the first five conductive paths, i.e. the wiring for terminal 509, between the smart sensor module 501 and the vehicle, please refer to FIG. 5, pole 5091 is coupled to the positive end of the ignition switch in the ACC state-ACC I/P(+), pole 5092 is coupled to the input terminal of the parking light I/P(+). Pole 5093 is coupled to the positive end of the battery, such as +12 volt, and the negative end of the battery, which is ground, is electrically coupled to pole 5094 of the connector terminal 509. In addition, pole 5095 of the connector terminal is coupled to the positive end of the input terminal of SIREN or HORN of the vehicle. As for the second five conductive paths, i.e. the wiring for terminal 509a, between the smart sensor module 501 and the vehicle, please refer to FIG. 5, pole 5096 is coupled to DOOR LOCK O/P(−), pole 5097 is coupled to DOOR UNLOCK O/P(−). Pole 5098 is coupled to SPEED I/P. In addition, pole 5099 of the second connector terminal 509a is coupled to DOOR SWITCH I/P(−), and pole 5100 of the second connector terminal 509a is coupled to DOOR SWITCH I/P(+). According to the present invention, DOOR LOCK O/P(−) is connected to provide a door lock signal output path to drive the vehicle's door switch by receiving a pulsed signal from the microprocessor to lock the vehicle's door, DOOR UNLOCK O/P(−) is connected to provide a door unlock signal output path to drive the vehicle's door switch by receiving a pulsed signal from the microprocessor to unlock the car door, SPEED I/P is connected for detecting vehicle's movement signal, DOOR SWITCH I/P(+) or SWITCH I/P(−) is connected to detect the vehicle's door signal for determining open/close state of the vehicle's door. In practice, only one of DOOR SWITCH I/P(+)/SWITCH I/P(−) wires is used depended on the wiring of vehicle's battery.

In one preferred embodiment of the present invention, there are at least three occasions, as mentioned in the paragraph immediately prior to this paragraph that the microprocessor 510 will send a signal through the output interface 540 to sound the SIREN/HORN of the vehicle. The three occasions mentioned above include the following scenarios when the smart sensor being in the ARM status. The first scenario is when the smart alarm module being in the ARM status and an impact occurred to the vehicle, such as a door or the trunk of the vehicle was opened, and the shock exceeds a preset value stored in the shock sensor 550, then a first activating signal is substantially fed to the microprocessor 510, and the microprocessor 510 will send an output-to-alarm signal to the output interface 540, and the voltage was regulated to the operation voltage level of the audio device of the vehicle, such as SIREN or HORN, or even buzzer adapted in the vehicle. The second scenario is when the smart alarm module being in the ARM status and the shock sensor detected that there is shockwave that is associated with a window or a door being broken. The shock sensor quantize the shock wave resulted from the impact occurred to the vehicle. When a shock wave larger than the adjustable preset value is detected, then an first activating signal is substantially fed to the microprocessor 510 from the shock sensor 550, and the microprocessor 510 will accordingly send a output-to-alarm signal to the output interface 540, and the voltage was therefore regulated to the operation voltage level of the audio device of the vehicle, such as SIREN or HORN of the vehicle, and make them honk. The third scenario is when the smart alarm module being in the ARM status and the ignition switch is turned through the "ACC" position reaching the START position trying to crank the engine, at this moment, the wire for providing power to electrical accessories, i.e., the wire coupled to the positive end of the accessory, i.e., ACC I/P (+) terminal, is on a high voltage level, for example, 12 volt, then the input interface 530 feed a second activating signal to the microprocessor 510. In responsive to the second activating signal from the input interface 530, the microprocessor 510 send the output-to-alarm signal to the output interface 540, therefore activating the audio device of the vehicle, i.e., sound the SIREN, HORN or buzzer.

It is well known in the art that many vehicles have adopted automatic starter rather than ignition switch, so the user only hit the starter position briefly, this action or a Jump Start trying to crank the engine, there will be a voltage switching on the positive end of ACC input terminal, i.e., ACC I/P (+) terminal. Therefore, if the aforementioned scenario happened in the vehicle equipped with the smart alarm module according to one embodiment of the present invention, because the voltage switched on the positive end of ACC input terminal at the time when the smart alarm module being in the ARM mode, the audio device, SIREN, HONK or buzzer, is subsequently activated by the output interface 540 responsive to the output-to-alarm signal from the microprocessor 510, which is fed with the second activating signal from the input interface 510.

The smart alarm module according to the present invention is compatible to the original remote controller from the vehicle's manufacturer, therefore, when performing auto security functions, not any additional remote controller is needed, and still, it can perform several basic features that tradition security system possesses. The basic features mentioned above include: once any of the three occasions happened to the vehicle, the SIREN/HORN of the vehicle will chirp for a certain period like 5 seconds or 45 seconds. When the smart alarm module is in alarm mode, and the ignition switch is turned to "ACC" position, then the siren will sound for 45 seconds. On the other hand, the sensor in one aspect of the preferred embodiment of the application to the present invention is configured as a dual zone shock sensor, which has a response mode divided into two stages: 1. Light Trigger: Warning by siren chirp 5 times. 2. Heavy Trigger: Warning by siren chirp 45 times.

According to the disclosure of the present invention, the technician only has to connect five connecting wires, i.e. wiring through 5091-5095, from the smart alarm module to corresponding devices of the vehicle, then the smart alarm system utilizing the smart alarm module can possess the three basic features of vehicle alarm system, wherein the functional block of the smart alarm module is disclosed in FIG. 5, and the operation of the smart alarm module is controlled by a program stored in the microprocessor 510. The flowchart of the aforementioned program is disclosed in FIG. 6, which is only utilized to illustrate how the smart alarm system—with only five connecting wires coupled to corresponding devices of the vehicle's-operates to perform the features of a security system in a vehicle.

Figure 6:
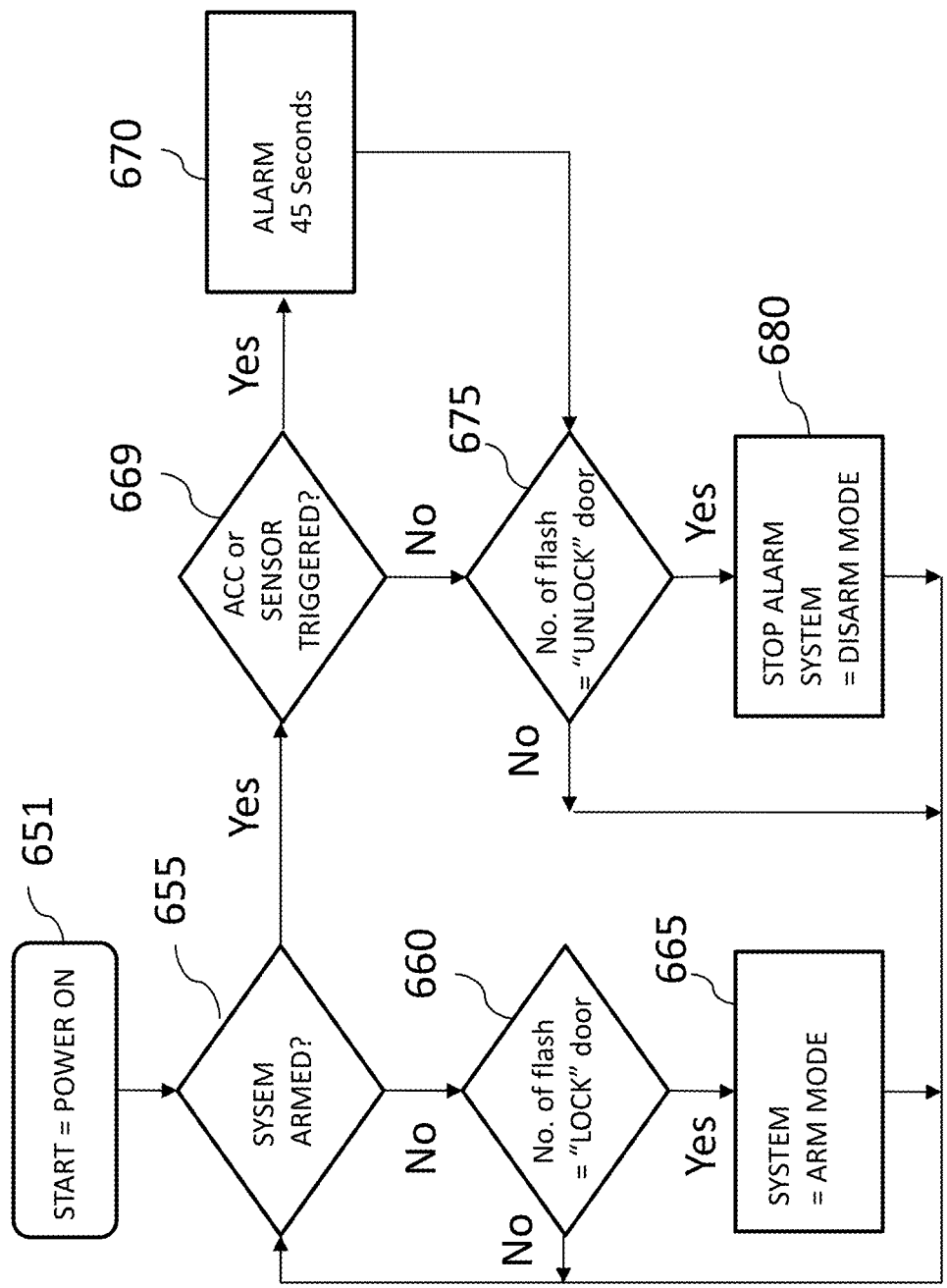
FIG. 6 illustrates the system protection process stored in the microprocessor of the smart sensor module that is used to perform the function as a smart alarm system according to the embodiment of the present invention.

After the smart alarm module according to one preferred embodiment of the present invention coupled to the connecting wires, which was coupled to the fuse box of the vehicle, starts a protection process to perform the function as a vehicle alarm system, and the process is depicted in FIG. 6. The steps shown in FIG. 6 is only one example to demonstrate how a certain steps are utilized to complete a couple of actions that perform the features of a smart alarm system according to the present invention. The protection process mentioned-above is stored in the microprocessor 510 (as shown in FIG. 5), and it begins from step 651 "START=POWER ON" to start this procedure, then the next step 655 "SYSTEM ARMED ?" is to determine whether the system, i.e., smart alarm module, is armed, if not, then go to step 660 "No. of flash="LOCK" door?", which means determining whether the number of parking light's flash time acquired from CAN bus through the input interface 530 equals to the "LOCK" value stored in the cue of Microprocessor 510, if yes, then go to step 665 "SYSTEM=ARM MODE" to set the status of the smart alarm module as ARMED, then go back to step 655 to determine whether the system is armed.

On the other hand, if the result of step 660 is no, then go back to step 655 "SYSTEM ARMED?" to check whether the smart alarm module, is armed, if not, then go to step 660 again, if yes, go to step 669 "ACC or Shock Sensor Triggered?" to check, through input interface 530, whether the ACC I/P (+) terminal is on a high voltage level, or whether the shock sensor 550 is triggered. If either one of the aforementioned happened, the Microprocessor 510 substantially send a signal through the output interface 540 and the wire coupled to a Horn/SIREN to make the Horn/SIREN 405 chirp, in other words, proceed to step 670 "ALARM 45 seconds", and then go to step 675 "No. of flash="UNLOCK" door?".

If the result of step 669 is no, meaning neither ACC I/P (+) terminal is on a high voltage level, nor the shock sensor 550 is triggered, then the next step after step 669 is step 675 "No. of flash="UNLOCK" door?", which means determining whether the number of parking light's flash time acquired from the input interface 530 equals to the "UNLOCK" value stored in the cue of Microprocessor 530. If the result of step 675 is no, then go back to step 655, determining whether the system is armed or not. On the other hand, if the result of step 675 is yes, then proceed to step 680 "STOP ALARM SYSTEM=DISARM MODE", which means set the smart security module as disarmed mode, in other words, the Microprocessor 510 send a signal through the output interface 540 and the wire coupled to a Horn/SIREN to make the Horn/SIREN 405 silent. Then the next step following step 680 is going back to the step 655, determining whether the system is armed or not.

As described in all previous paragraphs, when the driver lock/unlock the doors of the vehicle, the pattern of the number of times for headlight flashing and/or the number of times for SIREN/HORN chirping is "LOCK": flash/chirp one time, and "UNLOCK": flash/chirp twice, this parking light flash pattern is almost a worldwide standard for the all vehicles in the market. However, especially in the vehicle market of some European areas or other areas like Asia, Africa, Austria or some very limited areas or rare brands, there might be a couple varieties for the pattern of headlight/parking-light flash and/or SIREN/HORN chirps times when the vehicle being undergoing LOCK/UNLOCK the doors of the vehicle. To accommodate these varieties, the present invention provides a mechanism for the user to change the parking light flash pattern and siren-chirp pattern for automatically setting the smart security module as ARM/DISARM MODE.

The mechanism mentioned above is a system programming procedure, it is obvious that there can be many procedures utilize many other processes to accomplish the same goal as described in this disclosure, the following is only an example to illustrate one aspect of the embodiment of the application to the present invention. When the user want to change the pattern of headlight-flash and siren-chirp times for automatically setting the smart security module as ARM/DISARM MODE, the user can utilize the smart security module to proceed with a system programming procedure. To enter system programming, the user, at first, turn the ignition key, namely, ignition switch, to ACC position. Secondly, the user presses the Push Switch seven times in ten seconds, subsequently, the user turns the ignition key from ACC position to OFF position. After the entry of system programming, the light emitted diode (in FIG. 5, it is referred as number 570) will continuously blink, then the user can start to press the push switch as many times as the headlight blinks when the vehicle undergoing LOCK/UNLOCK action. Finally, this values will be stored into the cue of the microprocessor as the values utilized to determine whether the user press the LOCK or the UNLOCK button.

For example, if the setting of the vehicle from original manufacturer is that the blink pattern of the driver's vehicle is headlight flashes 10 times after the user press-down the LOCK button on the remote controller, and blinks 2 times after the user press-down the UNLOCK button on the remote controller, according to the embodiment of the present disclosure, the user of the smart alarm module should press the push switch 10 times to input a new number of headlight flash times, it is 10 in this example, and this value will be stored in the microprocessor 510 (FIG. 5) as lock number. Next time, if the driver press LOCK button, then the input interface 530 receives a signal composed of 10 pulses from the wire connected to pole 5092, in other words, the signal switched between voltage high and voltage low ten times. Accordingly, the microprocessor 510 compares the number from the input interface 530 with the default ARM number, in other words, LOCK value, stored in the cue of microprocessor 510, and find that it is a match, as a result, the microprocessor 510 sets the smart alarm module as ARM MODE. With the same manner, the user can subsequently utilize the number of headlight blink times, in this example, it is 2, to store into the cue of microprocessor 510 as the DISARM number, in other words, UNLOCK value, to determine when to set the smart alarm module as DISARM MODE.

From the previous paragraph, it is clear that the smart alarm module according to the present invention can be installed to the any kind of vehicles, even if, when undergoing ARM/DISARM action, the number of headlight blink times are different from that originally stored in the microprocessor of the smart alarm module in the present invention. The only learning procedure to program the setting of LOCK/UNLOCK value, the user only has to follow the steps as described in the previous paragraph. In other words, no matter what headlight flash pattern does a vehicle have, the smart alarm module according to the present invention has provided an operational process for the user to enter system programming, thus enabling the user to replace the originally default flash pattern number (LOCK/UNLOCK values) stored in the cue of the microprocessor with the practical flash pattern number comes with the setting from the vehicle's manufacturer, and making the smart alarm module automatically and correctly ARM/DISARM the smart alarm system when one button of the vehicle's remote controller being pressed-down to LOCK/UNLOCK the vehicle.

As described in paragraph [0063], the user can perform system programming by entering system programming process, which, in the first step turning ignition key to ACC, the second step pressing push button 7 times within 10 seconds, then turning from ACC to OFF. After the user's entry of system programming, the subsequent step is to learn ARM MODE, namely, input the headlight flash ARM number to the microprocessor. In order to reach this goal, after the entry of system programming, the user has to turn the ignition key the first time from OFF position to ON position, then the Siren will chirp once, and then, the user presses the push button 10 times, take the ARM number in paragraph [0061] as an example. At this time the headlight of the vehicle will flash once, and the siren chirp once. Then the user turn the ignition key from position ON back to position OFF to finish this step. The following step is the second step, which is the second time the user turning the ignition key from position OFF to position ON, and this action will result in the siren chirp twice, and this is the step the user input the headlight flash DISARM number to the microprocessor. In order to reach this goal, after the first step setting headlight flash ARM number, the user has to proceed the second step, turning the ignition key the second time from OFF position to ON position, then the Siren will chirp twice, and then, the user presses the push button 2 times, take the DISARM number in paragraph [0061] as an example. At this time the headlight of the vehicle will flash twice, and the siren will chirp twice. Then the user turn the ignition key from position ON back to position OFF to finish this step. The steps to headlight flash ARM number and DISARM number mentioned above is to show the alarm programmable features according to one aspect of one embodiment of the present invention, which is only an example, and is illustrated in Table 1 for reference.

TABLE 1

| No. | Function | Ignition OFF to ON 1st time Siren chirp once | Ignition OFF to ON 2nd time Siren chirp twice | |
|---|---|---|---|---|
| 1. | Learning mode | Learning ARM Mode (DF = 1 flash) | Learning DISARM Mode (DF = 2 flashs) | Siren chirp once |
| 2. | Siren/Horn | Horn | Siren (DF) | Siren chirp once |

Although a smart sensor module with the aforementioned functions (not include functions provided by the newly added second five-wire connector) can provide basic protection and security requirements, but some more protection function still required. In the present invention, we have proposed a new design of smart sensor module (see FIG. 2, FIG. 4, and FIG. 5), which integrates two additional functions in the original smart sensor module. The first function added is automatically locked the car door lock when the vehicle is moving, it can be described as a situation that every time the door is opened and then closed, then the vehicle will automatically lock the door after 3 seconds of driving. The second function added is to turn on the door lock after the vehicle is turned off, it can be described as a situation that once the vehicle being turned off, the vehicle automatically unlocks the door.

Figure 7:
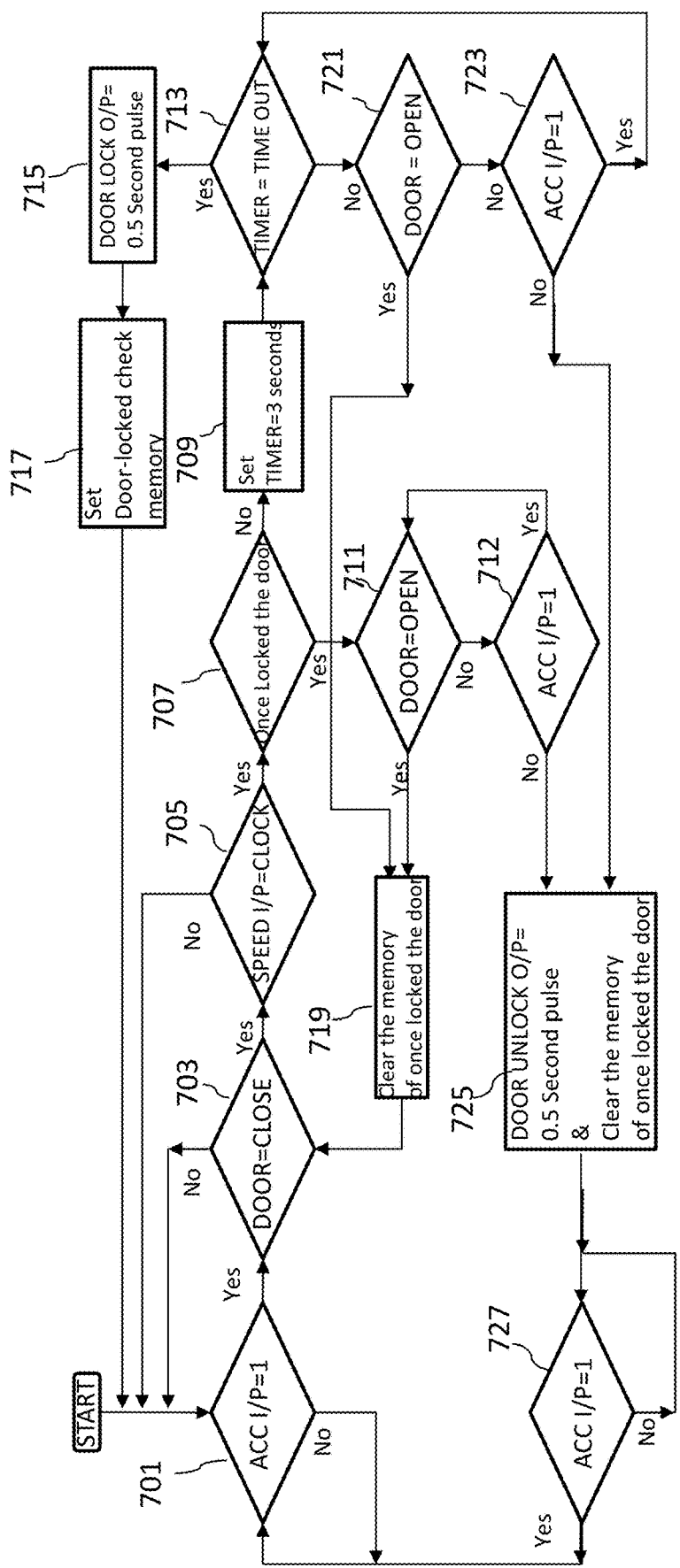
FIG. 7 illustrates a flow chart describing a procedure to operate speed lock/ACC off unlock function of the smart sensor module according to a preferred embodiment of the present invention.

FIG. 7 illustrates a flowchart for operating speed lock/ACC off unlock function of the smart sensor module. According to one aspect of the present invention, a procedure to operate speed lock/ACC off unlock function of the smart sensor module can be disclosed as follows, it begins in step 701 "ACC I/P=1" to check whether the vehicle's start switch is ON, then proceeds to step 703 "DOOR=CLOSE" to check if all of the vehicle's doors are closed (step 703), otherwise go back to step 701. In step 705 "SPEED I/P=CLOCK" is to determine whether the vehicle is moving or not by detecting clock pulse signal, then proceeds to check if all of the vehicle's doors are locked (step 707), otherwise go back to step 701. In step 707 "Once locked the door" check if any of the vehicle's doors isn't locked then proceed to step 709 "SET TIMER=3 seconds" to set timer equal to 3 seconds, otherwise proceed to step 711 "DOOR=OPEN" to check if any of the vehicle's doors is opened. After setting timer in step 709, proceeds to step 713. In step 713 "TIMER=TIME OUT" is to check whether the timer exceeds 3 seconds then proceeds to step 715 "DOOR LOCK O/P=0.5 Second pulse" to lock the vehicle's doors by sending 0.5 second pulse door lock signal. In step 717 "Set Once Locked memory" sets door-locked check memory then go back to step 701. In step 711, if at least one of the vehicle's doors is opened then proceeds to step 719, otherwise proceeds to step 712. In step 719 "Clear the memory of once locked the door" clears the door-locked check memory, then go back to step 703. In step 712, if the vehicle's start switch is ON goes back to step 711, otherwise proceeds to step 719. In step 713, if the timer doesn't exceeds 3 seconds then proceeds to step 721 to check if any of the vehicle's doors is opened. In step 721, if at least one of the vehicle's doors is opened then goes back to step 719, otherwise proceeds to step 723. In step 723, if the vehicle's start switch is ON then goes back to step 713, otherwise proceeds to step 725. In step 725 "DOOR UNLOCK O/P=0.5 second pulse & Clear the memory of once locked the door" unlocks the vehicle's doors by sending 0.5 second pulse door-unlocked signal and clears the door-locked check memory, then proceeds to check if the vehicle's start switch is ON.

As described in the previous paragraph, it clearly shows how vehicle's doors are automatically locked when the vehicle is moving, which can be realized through steps 701→703→707→709→713→715→717→701. In addition, once the vehicle is turned off, the smart sensor module automatically unlock the doors, which can be realized through either steps 723→725 or steps 712→725.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A smart alarm module having an arm and disarm mode respectively settable in response to a remote controller equipped together with a vehicle, the vehicle including an on-board electronics installed in the vehicle, a battery, a connector wire set, a fuse box, and an audio device and an ignition switch having an on state, an ACC state and an off state, the smart alarm module comprising:
   a first connector terminal adapted to provide conductive paths from the fused box and the audio device of the vehicle to the smart alarm module;
   a second connector terminal adapted to provide conductive paths from the on-board electronics of the vehicle to the smart alarm module, wherein the second connector terminal comprises a door lock signal output path adapted to drive the vehicle's door switch by receiving a pulsed signal from the microprocessor to lock the vehicle's door, a door unlock signal output path adapted to drive the vehicle's door switch by receiving a pulsed signal from the microprocessor to unlock the vehicle's door, a speed signal input path adapted to detect the vehicle's movement, and a door switch signal input path adapted to detect the vehicle's door signal for determining open/close state of the vehicle's door;
   an input interface adapted to make connection to the on-board electronics of the vehicle to detect communication protocol and receive information from the remote controller;
   a microcontroller adapted to arm the smart alarm module in response to the information received from the remote controller to provide the smart alarm module judgment operation based on the received information;
   a sensor adapted to quantized shock waves applied to the vehicle and to feed a first activating signal to the microprocessor when the quantized values exceeds a predetermined value;
   a power supply regulator for regulating and providing power to the input interface, the microprocessor, and the sensor of the smart alarm module; and
   an output interface adapted to sound the audio device, drive the vehicle's door switch in response to output signal from the microprocessor, and detect vehicle's speed from the on-board electronics.

2. The smart alarm module of claim 1, wherein the door lock signal output path is coupled to the output interface.

3. The smart alarm module of claim 1, wherein the speed signal input path is coupled to the input interface.

4. The smart alarm module of claim 1, wherein the door unlock signal output path is coupled to the output interface.

5. The smart alarm module of claim 1, wherein the door switch signal input path is coupled to the output interface.

6. The smart alarm module of claim 1, wherein the sensor is selected form the group consisting of: a pizeo shock sensor, a magnetic shock sensor, an ultrasonic sensor, a microwave sensor.

7. The smart alarm module of claim 1, wherein the audio device is selected form the group consisting of: car horn, siren, buzzer, and combinations thereof.

8. The smart alarm module of claim 1 further comprising an arm mode and a disarm mode respectively settable in response to a press-down on a lock button and the other press-down on an unlock button of the remote controller.

9. The smart alarm module of claim 8, wherein the microprocessor adapted to arm the smart sensor module in response to the press-down on the lock button resulting in number of voltage-switching times on a positive end of an exterior lighting device of the vehicle equals to a lock value stored in the microprocessor, the microprocessor responsively setting the smart sensor module as disarm mode when the press-down on the unlock button resulting in number of voltage-switching times on the positive end of the exterior lighting device equals to an unlock value stored in the microprocessor, wherein a protection process and a system programming process being stored in the microprocessor, the system programming process providing a mechanism to reset the lock value and the unlock value.

10. The smart alarm module of claim 9, wherein the exterior lighting device is selected from the group consisting of: light bulb, light emitted diodes, and combinations thereof.

11. The smart sensor module as claim 9 further comprising a light emitted diode for indicating whether the smart sensor module being in the arm mode, the disarm mode, or the system programming process being performing by the microprocessor.

12. The smart alarm module of claim 1, wherein the smart alarm module having the second connector terminal is operable to perform a speed lock/AC off unlock door process for the vehicle.

13. The smart alarm module of claim 12, the speed lock/AC off unlock door process comprising the step of:
a first step, determining if the vehicle's start switch is turned on, if yes, then determining if all of the vehicle's doors are closed, otherwise go to the first step;
determining if the vehicle is moving or not, if yes, go to next step;
determining if all of the vehicle's doors are locked, if not, go to the following steps:
setting a timer to be a first period of time, then determining if the timer exceeds the first period of time, if yes, lock the vehicle's doors, sets door-locked memory, then go to the step one, otherwise go to next step;
determining if all of the vehicle's doors are closed, if yes, clearing the door-locked memory, otherwise go to next step;
determining if the vehicle's start switch is turned on, if not, unlocks the vehicle's doors.

14. The smart alarm module of claim 13, wherein the first period of time is three seconds.

15. The smart alarm module of claim 13, wherein the step of locking the vehicle's door is performed by receiving a 0.5 second pulse signal from the microprocessor.

16. The smart alarm module of claim 13, wherein the step of unlocking the vehicle's door is performed by receiving a 0.5 second pulse signal from the microprocessor.

* * * * *